United States Patent
Yamada et al.

(10) Patent No.: US 10,372,311 B2
(45) Date of Patent: Aug. 6, 2019

(54) DISPLAY CONTROL DEVICE

(71) Applicant: DENSO CORPORATION, Kariya, Aichi-pref. (JP)

(72) Inventors: Kazunao Yamada, Kariya (JP); Masakazu Itou, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 746 days.

(21) Appl. No.: 14/781,871

(22) PCT Filed: Mar. 27, 2014

(86) PCT No.: PCT/JP2014/001781
§ 371 (c)(1),
(2) Date: Oct. 1, 2015

(87) PCT Pub. No.: WO2014/162703
PCT Pub. Date: Oct. 9, 2014

(65) Prior Publication Data
US 2016/0041732 A1 Feb. 11, 2016

(30) Foreign Application Priority Data
Apr. 5, 2013 (JP) .................................. 2013-079695

(51) Int. Cl.
*G06F 9/451* (2018.01)
*G06F 3/0481* (2013.01)
(Continued)

(52) U.S. Cl.
CPC ........ *G06F 3/04845* (2013.01); *G06F 3/0481* (2013.01); *G06F 3/0482* (2013.01); *G06F 9/451* (2018.02)

(58) Field of Classification Search
CPC ...... G06F 3/04845; G06F 9/451; G06F 9/456; G06F 3/0482
See application file for complete search history.

(56) References Cited

U.S. PATENT DOCUMENTS

| | | | |
|---|---|---|---|
| 8,718,797 B1 * | 5/2014 | Addepalli | H04W 4/046 700/17 |
| 2006/0256722 A1 * | 11/2006 | Taha | H04L 47/10 370/235 |

(Continued)

FOREIGN PATENT DOCUMENTS

| | | |
|---|---|---|
| JP | H02082314 A | 3/1990 |
| JP | H05053839 A | 3/1993 |

(Continued)

OTHER PUBLICATIONS

International Search Report and Written Opinion (in Japanese with English Translation) for PCT/JP2014/001781, dated Jul. 8, 2014; ISA/JP.

*Primary Examiner* — Timothy A Mudrick
*Assistant Examiner* — Phuong N Hoang
(74) *Attorney, Agent, or Firm* — Harness, Dickey & Pierce, P.L.C.

(57) ABSTRACT

A display control device includes a sift portion that sifts a transition request event stored in a queue. The sift portion monitors the queue. When the queue stores several transition request events corresponding to the same type of screen-image after transition, the sift portion retains the most recent one of the transition request events and discards the other transition request events corresponding to the same type of screen-image after transition. This can decrease transition request events stored in the queue compared to a case of not sifting transition request events and reduce a possibility of generating a delay. The sift portion does not sift a transition request event that transitions to a different type of screen-image. This can display the type of screen-image a user intends to display based on his or her manipulation.

6 Claims, 6 Drawing Sheets

(51) Int. Cl.
    *G06F 3/0482*     (2013.01)
    *G06F 3/0484*     (2013.01)

(56) References Cited

U.S. PATENT DOCUMENTS

| | | | | |
|---|---|---|---|---|
| 2006/0288372 | A1* | 12/2006 | Harada | G06F 3/0482 |
| | | | | 725/53 |
| 2009/0278949 | A1* | 11/2009 | McMahan | G06F 16/583 |
| | | | | 348/222.1 |
| 2010/0004850 | A1* | 1/2010 | Arita | G01C 21/36 |
| | | | | 701/532 |
| 2011/0032094 | A1* | 2/2011 | Nishida | B60K 35/00 |
| | | | | 340/459 |
| 2011/0112750 | A1* | 5/2011 | Lukassen | G01C 21/3676 |
| | | | | 701/532 |
| 2011/0273471 | A1* | 11/2011 | Nagasaka | H04N 5/23212 |
| | | | | 345/619 |

FOREIGN PATENT DOCUMENTS

| | | | |
|---|---|---|---|
| JP | H09097149 | A | 4/1997 |
| JP | H102606973 | A | 9/1998 |
| JP | 2000181588 | A | 6/2000 |
| JP | 2004260534 | A | 9/2004 |
| JP | 2013168106 | A | 8/2013 |
| JP | 2015114799 | * | 6/2015 |

* cited by examiner

DISPLAY CONTROL DEVICE

CROSS REFERENCE TO RELATED APPLICATIONS

This application is a U.S. National Phase Application under 35 U.S.C. 371 of International Application No. PCT/JP2014/001781 filed on Mar. 27, 2014 and published in Japanese as WO 2014/162703 A1 on Oct. 9, 2014. This application is based on and claims the benefit of priority from Japanese Patent Application No. 2013-079695 filed on Apr. 5, 2013. The entire disclosures of all of the above applications are incorporated herein by reference.

TECHNICAL FIELD

The present disclosure relates to a device that controls a screen-image displayed on a screen of a display device.

BACKGROUND ART

It has been known a display control device that accepts user manipulation and transitions a screen-image displayed on a display device to a different type of screen-image (for example, see patent literature 1). This type of display control device once stores an event to transition a screen-image in a queue when accepting user manipulation to change a screen-image via an input device such as a switch. The display control device sequentially performs events from the one at the beginning of the queue based on situations of loads on a CPU that processes events.

PRIOR ART LITERATURE

Patent Literature

Patent literature: JP H10-260973 A

SUMMARY OF INVENTION

A queue accumulates events if the number of events input to the queue is larger than the number of events output from the queue. A result is to increase a delay in performing an event after it is accepted. The user convenience is degraded.

If events stay in a queue, user manipulation may be rejected or a newly received event may be discarded. In such a case, a screen-image intended for the user may not be displayed.

The present disclosure has been made in consideration of the foregoing. It is an object of the present disclosure to provide a display control device that decreases a possibility of unsuccessfully displaying a screen-image intended for a user and hardly causes a delay.

A display control device according to an aspect of the present disclosure includes an input acceptance portion, a queue, and a screen-image processing portion. The input acceptance portion accepts user manipulation input that allows a screen-image displayed on a screen of a display device displaying several types of screen-images to transition to another type of screen-image. The queue stores a transition request event that transitions a screen-image to another screen-image corresponding to manipulation input accepted by the input acceptance portion. The screen-image processing portion transitions a screen-image based on the transition request event. The display control device further includes a sift portion to sift the transition request event stored in the queue. When the queue stores the transition request events, the sift portion retains one of the transition request events, if any, corresponding to the same type of screen-image after transition and discards the other transition request events corresponding to the same type of screen-image after transition.

According to the configuration, when there are transition request events corresponding to the same type of screen-image after transition, the sift portion retains one of the duplicate transition request events and discards the other. This can decrease transition request events stored in the queue compared to a case of not sifting transition request events and reduce a possibility of generating a delay.

The sift portion does not sift a transition request event that transitions to a different type of screen-image. This can display the type of screen-image a user intends to display based on his or her manipulation.

BRIEF DESCRIPTION OF DRAWINGS

The above and other objects, features and advantages of the present disclosure will become more apparent from the following detailed description made with reference to the accompanying drawings, in which.

DESCRIPTION OF EMBODIMENTS

Figure 1:
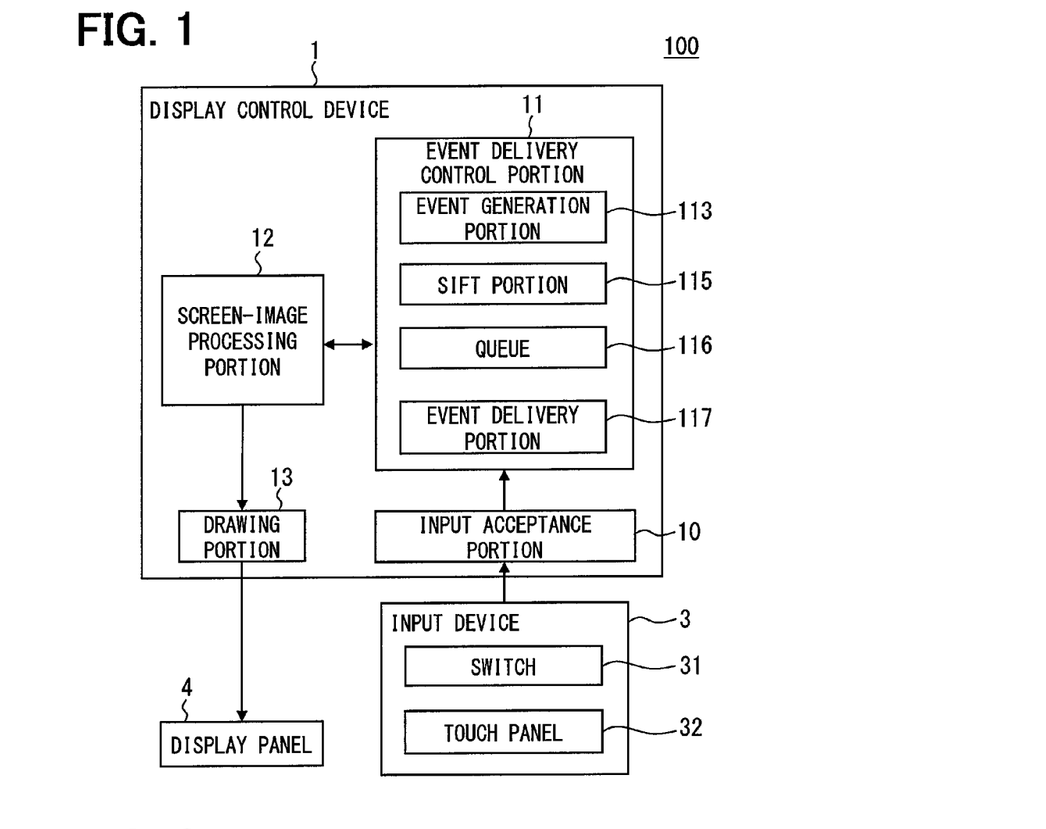
FIG. 1 is a block diagram illustrating a configuration of a display system including a display control device according to an embodiment.

With reference to FIGS. 1 through 11, the following describes an embodiment of the present disclosure. FIG. 1 is a block diagram illustrating a configuration of a display system 100 including a display control device 1 according to the present disclosure. The embodiment provides an example of applying the display system 100 to a vehicular navigation system. Obviously, the display control device 1 according to the present disclosure may be applied to a mobile telephone or a tablet computer.

As illustrated in FIG. 1, the display system 100 includes a display control device 1, an input device 3, and a display panel (display device) 4. The display control device 1, the input device 3, and the display panel 4 are connected to each other via an in-vehicle LAN compliant with the communication protocol such as CAN (Controller Area Network).

The display panel 4 displays text or an image based on input from the display control device 1. The display panel 4 may use a TFT liquid crystal display or an organic EL display capable of color display. The display panel 4 is overlaid with a touch panel 32 included in the input device 3 to be described later.

The display panel 4 displays several types of screen-images based on output from the display control device 1. Types of screen-images to be displayed on a screen of the display panel 4 include a menu screen-image, a navigation screen-image, a rear-view camera screen-image, an AM radio screen-image, an FM radio screen-image, a CD replay screen-image, a DVD replay screen-image, and an external input screen-image. A menu screen-image illustrated in FIG. 3 displays buttons to select services (such as audio, navigation, and DVD replay) provided by the navigation system. A user can touch a part of the touch panel 32 corresponding to a button displayed on the screen to receive a selected service. When the user touches an area of the touch panel 32 corresponding to a display area for a DVD button 32D, the display control device 1 performs a process that transitions the screen-image from the menu screen-image to the DVD replay screen-image.

Figure 4:
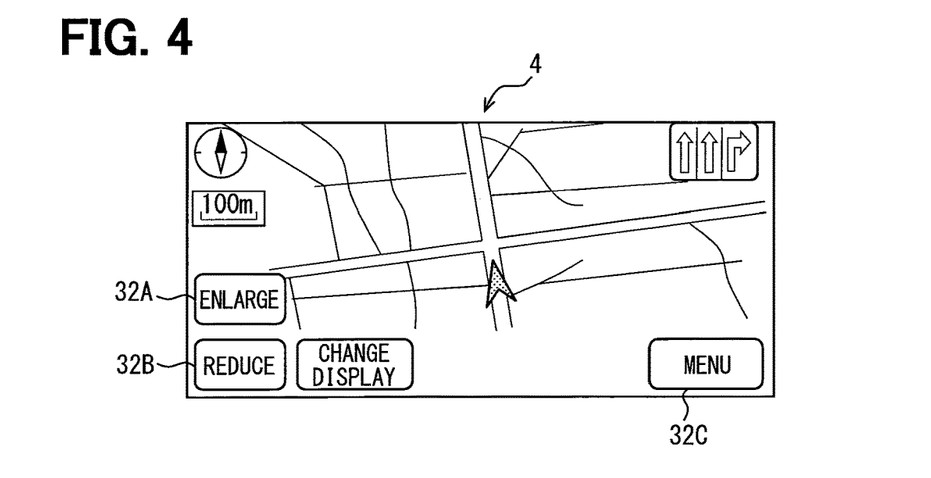
FIG. 4 is a schematic diagram illustrating the display panel that displays a navigation screen-image.
Figure 5:
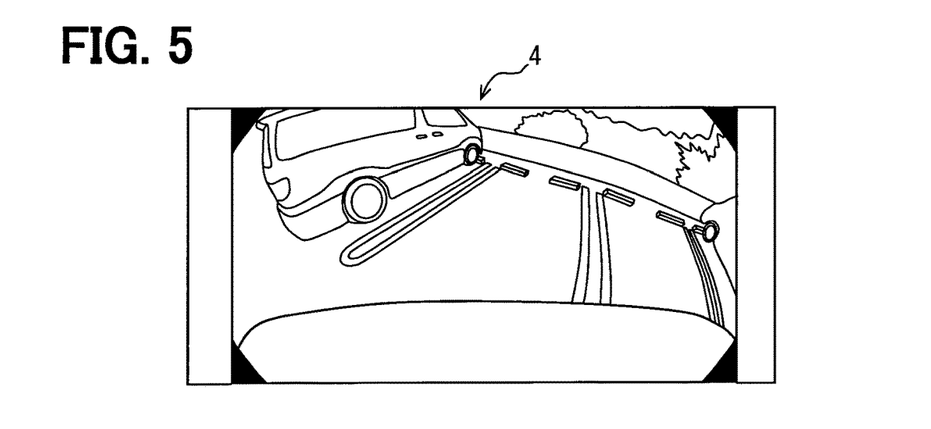
FIG. 5 is a schematic diagram illustrating the display panel that displays a rear-view camera screen-image.

The navigation screen-image illustrated in FIG. 4 displays a map for route guidance or a vehicle position. The navigation screen-image further displays an enlargement button 32A to increase the map scale or a reduction button 32B to decreases the map scale. The rear-view camera screen-image illustrated in FIG. 5 displays an image captured by a rear-view camera (not illustrated) that images the rear of the vehicle. When a gearshift lever is moved to the rearward position (rear), a signal to display the rear-view camera screen-image is automatically supplied to the display control device 1.

The display panel 4 also displays a destination setup screen-image that allows a user to set a destination in the navigation system.

Figure 2:
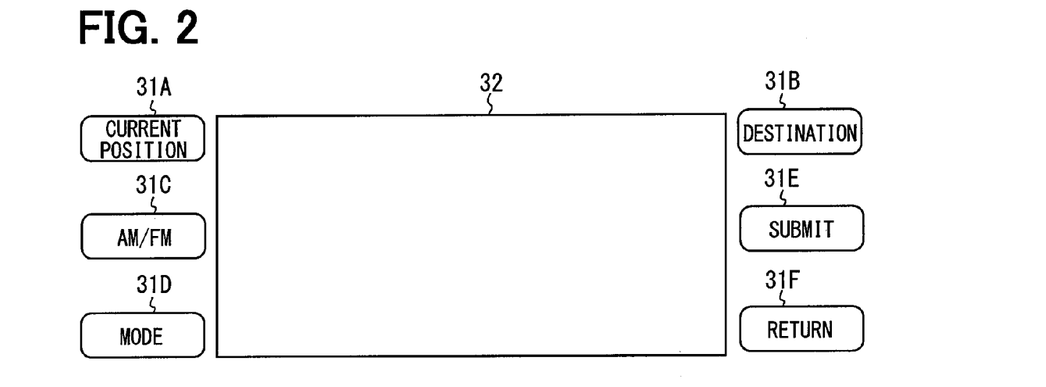
FIG. 2 is a schematic diagram illustrating a configuration of an input device in the display control device according to the embodiment.
Figure 3:
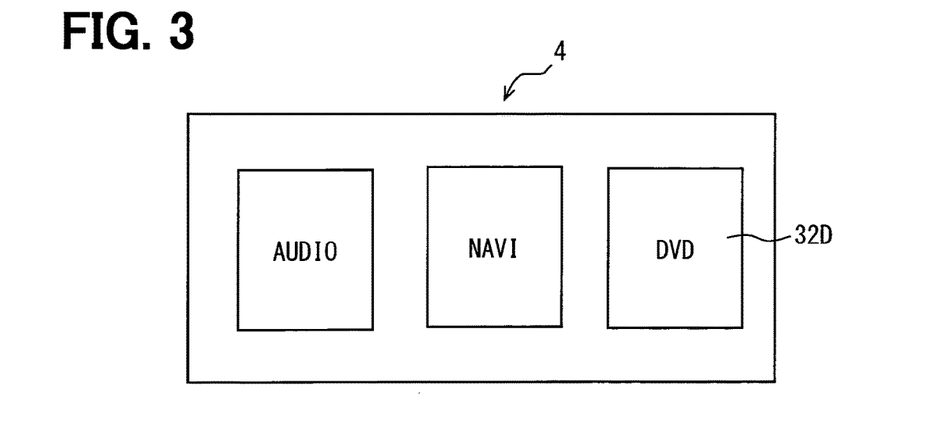
FIG. 3 is a schematic diagram illustrating a display panel that displays a menu screen-image.

The input device 3 accepts user manipulation to change the screen-image. As illustrated in FIG. 2, the input device 3 includes several types of mechanical switches (hereinafter referred to simply as switches) 31A through 31F and a touch panel 32. When a switch is pressed, the input device 3 supplies the display control device 1 with a signal indicating that the switch is pressed. When a user manipulates the touch panel 32, the input device 3 supplies the display control device 1 with a signal corresponding to the touch manipulation. The gearshift lever (not illustrated) also works as the input device 3 that accepts an input to change the screen-image corresponding to a lever position (such as the rearward position).

FIG. 2 illustrates a current position switch 31A. When the user presses the current position switch 31A, the input device 3 supplies the display control device 1 with a switch manipulation signal indicating that the current position switch 31A is pressed. The display control device 1 is supplied with the switch manipulation signal indicating that the current position switch 31A is pressed. The display control device 1 then performs a process to display a map on the navigation screen-image so that the current vehicle position approximately corresponds to the center of the screen-image.

FIG. 2 illustrates a destination switch 31B. When the destination switch 31B is pressed, the input device 3 supplies the display control device 1 with the switch manipulation signal indicating that the destination switch 31B is pressed. The display control device 1 is supplied with the switch manipulation signal indicating that the destination switch 31B is pressed. The display control device 1 then performs a process to display the destination setup screen-image.

FIG. 2 illustrates a radio switch 31C. Each time the user presses the radio switch 31C, he or she can change the screen-image to the AM radio screen-image and the FM radio screen-image in this order. The radio switch 31C toggles between the AM radio screen-image and the FM radio screen-image to be displayed. Pressing the radio switch 31C first displays the AM radio screen-image if none of the AM radio screen-image and the FM radio screen-image is displayed.

FIG. 2 illustrates a mode switch 31D. Each time the user presses the mode switch 31D, he or she can change the screen-image to the CD replay screen-image, the DVD replay screen-image, and the external input screen-image in this order (media change sequence). The user needs to press the mode switch 31D twice to change the CD replay screen-image to the external input screen-image. Pressing the mode switch 31D first displays the CD replay screen-image if none of the CD replay screen-image, the DVD replay screen-image, and the external input screen-image is displayed.

FIG. 2 illustrates a return switch 31F. When the user presses the return switch 31F, the input device 3 supplies the display control device 1 with the switch manipulation signal indicating that the return switch 31F is pressed. The display control device 1 is supplied with the switch manipulation signal indicating that the return switch 31F is pressed. The display control device 1 then performs a process to resume the last screen-image but one from a history of hitherto displayed screen-images. The current screen-image may display options (YES/NO) for confirmation. In such a case, the user can press the return switch 31F to select NO. The return switch 31F operates differently depending on the situation of the screen-image when the switch is pressed.

FIG. 2 illustrates a submit switch 31E. When the user presses the submit switch 31E, the input device 3 supplies the display control device 1 with the switch manipulation signal indicating that the submit switch 31E is pressed. When the current screen-image displays options (YES/NO) for confirmation, the user can press the submit switch 31E to select the affirmation (YES) and advance the screen-image. There may be a case where no options for confirmation are displayed and the return button 31F is manipulated to resume the last screen-image but one. The user can press the advance button 31E to advance the screen-image. The display control device 1 performs different processes depending on situations in which the submit switch 31E is pressed.

The touch panel 32 detects a position touched by a user based on a known technology. The touch panel 32 may be available as a capacitance type or a pressure-sensitive type. When the user's touch manipulation is detected, the touch panel 32 detects the touch position and supplies the display control device 1 with a signal (touch manipulation signal) containing the touch position. When the touch manipulation signal is input, the display control device 1 acquires the information indicating an occurrence of the touch manipulation and the touched position. The touch panel 32 may detect flick manipulation that allows a finger to slide in contact with the touch panel. In this case, the touch panel 32 supplies the display control device 1 with a flick manipulation signal containing a direction and a speed to move the finger. The display control device 1 may be supplied with the flick manipulation signal while the navigation screen-image is displayed. In this case, the display control device 1 performs a process to display a map image by scrolling the map image in the flick direction.

The display control device 1 mainly includes a microcomputer including a CPU, memory devices such as ROM, RAM, and EEPROM, and I/O device, and a bus connecting these components according to the known technology.

The display control device 1 performs a process to change a screen-image displayed on the display panel 4 based on a signal supplied from the input device 3. The display control device 1 includes an input acceptance portion 10, an event delivery control portion 11, and a screen-image processing portion 12, and a drawing portion 13 as functions to implement the process.

When supplied with various manipulation signals from the input device 3, the input acceptance portion 10 provides an input interface function that generates a signal (manipulation acceptance signal) corresponding to the manipulation signal and outputs the signal to the event delivery control portion 11. The manipulation acceptance signal contains the contents (hereinafter referred to as the manipulation information) of the manipulation the user performed on the input device 3. The manipulation information is equal to the information contained in the manipulation signal the input device 3 outputs to the input acceptance portion 10. The manipulation information indicates which of the switches was manipulated, for example.

The event delivery control portion 11 communicates with the input acceptance portion 10 and the screen-image processing portion 12 and controls a process (event) the screen-image processing portion 12 performs. The event delivery control portion 11 includes an event generation portion 113, a queue 116, a sift portion 115, and an event delivery portion 117 as subdivided functions. The queue 116 temporarily stores an event the event delivery control portion 11 receives or generates. The queue 116 uses an FIFO (First In First Out) list structure that allows events to be performed in order of arrival.

The event generation portion 113 generates an event (input event) that inquires the screen-image processing portion 12 of a processing content corresponding to a manipulation acceptance signal supplied from the input acceptance portion 10. After performing an input event, the event generation portion 113 may receive an instruction from the screen-image processing portion 12 in order to transition the screen-image. In this case, the event generation portion 113 generates an event (transition request event) to transition to a screen-image specified by the screen-image processing portion 12. As a result of performing an input event, the event generation portion 113 may receive an instruction from the screen-image processing portion 12 in order to perform a function (such as enlarged display) to change a display of the screen-image without transition to a different type of screen-image. In such a case, the event generation portion 113 generates an event (function execution event) to perform the function. The queue 116 stores the various events generated as described above.

The event delivery portion 117 monitors situations of a process performed by the screen-image processing portion 12 (more strictly, the CPU included in the display control device 1). The event delivery portion 117 sequentially delivers an event stored at the beginning of the queue 116 to the screen-image processing portion 12 each time an ongoing process is completed. The sift portion 115 sifts various sorts of events from events stored in the queue 116. The sift portion 115 will be described in detail later. The following describes functions of the screen-image processing portion 12 that performs various events.

The screen-image processing portion 12 performs events (such as an input event, a transition request event, and a function execution event) delivered from the event delivery control portion 11 while communicating with the event delivery control portion 11 or the drawing portion 13.

During an input event, the screen-image processing portion 12 acquires manipulation information from the event delivery control portion 11 and determines a process content based on the manipulation information. Process contents corresponding to the input event according to the embodiment are broadly classified into: transitioning to a different type of screen-image; and performing a function (enlargement/reduction or scroll) to change a display on the same type of screen-image. A screen-image transition process determines a transition destination screen-image as a destination screen-image to transition and returns a signal to the event delivery control portion 11 in order to request generation of an event that enables the transition destination screen-image. A procedure to determine the process content depends on whether the input event results from manipulation of the switch 31 or the touch panel 32.

When the switch 31 is manipulated, the screen-image processing portion 12 determines an event corresponding to the manipulated switch. When the current position switch 31A is pressed, a current position screen-image is used as the current screen-image regardless of the current screen-image. When the destination switch 31B is pressed, a destination setup screen-image is used as the current screen-image regardless of the current screen-image.

When the radio switch 31C is pressed, the screen-image processing portion 12 determines a transition destination based on the type of the current screen-image and the number of unprocessed transition request events resulting from the radio switch 31C. An unprocessed event in the following description signifies: the event being stored in the queue 116 and waiting to be processed; and the event being currently in process. The AM radio screen-image is used as the transition destination screen-image corresponding to a press of the radio switch 31C if the AM radio screen-image and the FM radio screen-image are currently inactive and no unprocessed transition request event results from the radio switch 31C. The FM radio screen-image is used as the transition destination screen-image if the AM radio screen-image and the FM radio screen-image are currently inactive and one unprocessed transition request event results from the radio switch 31C.

When the mode switch 31D is pressed, the screen-image processing portion 12 determines the transition destination screen-image based on a predetermined media change sequence, the current screen-image, and the number of unprocessed transition request events resulting from the mode switch 31D. The DVD replay screen-image is used as the transition destination screen-image corresponding to a press of the mode switch 31D if the CD replay screen-image is currently active and no unprocessed transition request event results from the mode switch 31D. The external input screen-image is used as the transition destination screen-image if the mode switch 31D is again pressed (twice) before the current screen-image transitions to the DVD replay screen-image.

When the return switch 31F is pressed, the screen-image processing portion 12 references a history of the screen-image transition and settles the transition destination screen-image using as many screen-images displayed in the past as the number of presses on the return switch 31F. When an option such as YES/NO is currently displayed, the screen-image processing portion 12 returns a response to the event delivery control portion 11 in order to perform a process corresponding to the selection of NO. The process depends on the state of the screen-image corresponding to a press of the return switch 31F or a history of hitherto displayed screen-images.

When the submit switch 31E is pressed, the screen-image processing portion 12 references a history of the screen-image transition and settles the transition destination screen-image by advancing as many screen-images as the number of presses on the submit switch 31E. When an option such as YES/NO is currently displayed, the screen-image processing portion 12 returns a response to the event delivery control portion 11 in order to perform a process corresponding to the selection of YES. The process also depends on the state of the screen-image corresponding to a press of the submit switch 31E or a history of hitherto displayed screen-images.

When the touch panel 32 is manipulated, the screen-image processing portion 12 determines whether or not the touch panel 32 is touched or flicked. When the touch panel 32 is touched, the screen-image processing portion 12 determines which button displayed on the screen-image the user operated, based on the touch position and the current display screen-image configuration. Suppose that the touch position is contained in an area to display the DVD button 32D on the menu screen-image illustrated in FIG. 3. In this case, the screen-image processing portion 12 assumes a DVD replay screen-image to be the transition destination screen-image. Suppose that the touch position is contained in an area to display the DVD button 32D on the navigation screen-image illustrated in FIG. 4. In this case, the screen-image processing portion 12 returns an instruction to the event delivery control portion 11 in order to enlarge a displayed map. Similarly, suppose that the screen-image processing portion 12 determines that the reduction button 32B is pressed. In this case, the screen-image processing portion 12 returns an instruction to the event delivery control portion 11 in order to reduce a displayed map. When the flick manipulation is accepted, the screen-image processing portion 12 returns an instruction to the event delivery control portion 11 in order to scroll the screen-image in the direction of the flick manipulation.

When a response that requests to perform the transition to a different type of screen-image is made as a result of the input event, the event generation portion 113 generates a transition request event to transition to the transition destination screen-image and delivers the transition request event to the screen-image processing portion 12. The transition request event acquires data to draw the transition destination screen-image and allows the drawing portion 13 to draw the transition destination screen-image. The drawing portion 13 draws the transition destination screen-image according to the process in the screen-image processing portion 12 to transition the screen-image. When completing the drawing, the drawing portion 13 returns a completion signal indicating completion of the drawing to the screen-image processing portion 12. The screen-image processing portion 12 is notified of completion of the drawing and returns a signal to the event delivery control portion 11 in order to notify that the transition request event is completed.

When a response that requests to perform a function of changing the display of the screen-image is made as a result of the input event the event generation portion 113 generates a function execution event to perform the function and delivers the function execution event to the screen-image processing portion 12. The function execution event allows the drawing portion 13 to change the display of the screen-image based on the content of the function execution event. Major function execution events increase or reduce a scale of a display and scroll the screen-image.

Figure 6:
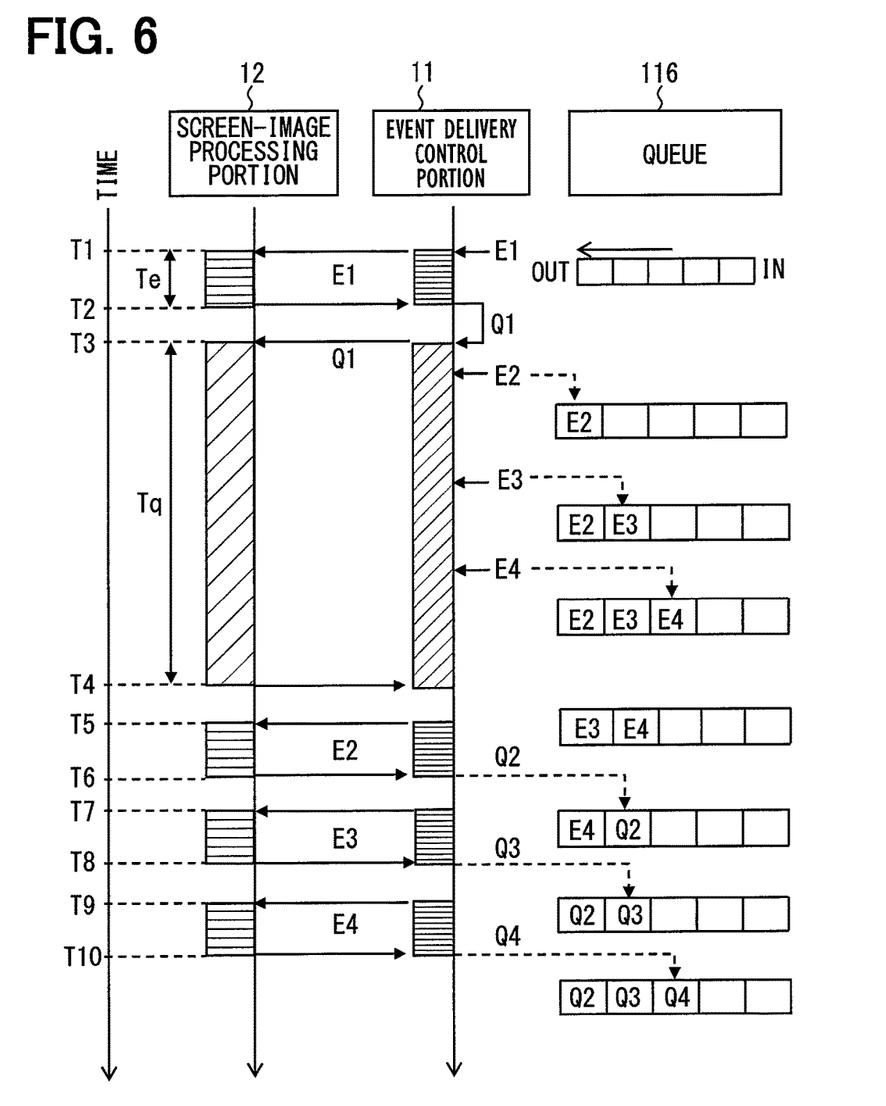
FIG. 6 is a conceptual diagram illustrating a flow of processing various events in an event delivery control portion, a screen-image processing portion, and a queue.

With reference to FIG. 6, the following describes a process flow of the display control device 1. FIG. 6 illustrates chronological changes in states of the event delivery control portion 11, the screen-image processing portion 12, and the queue 116. In FIG. 6, reference symbol E denotes an input event. Input events E1 through E4 are assumed to result from user's input manipulation to request transition of screen-images. Reference symbols Q1 through Q4 denote transition request events corresponding to input events E1 through E4.

Suppose that the queue 116 stores nothing (no wait). Input event E1 arrives at time T1. The event delivery portion 117 of the event delivery control portion 11 delivers input event E1 to the screen-image processing portion 12. The screen-image processing portion 12 receives and performs input event E1. Input event E1 terminates at time T2. The screen-image processing portion 12 then notifies the screen-image to transition to the event delivery control portion 11. The event delivery control portion 11 is notified of termination of input event E1 and generates transition request event Q1. Nothing is stored in the queue 116 at this time. The event delivery control portion 11 directly delivers transition request event Q1 to the screen-image processing portion 12 and allows the screen-image processing portion 12 to perform transition request event Q1 (T3). Input events E2 through E4 arrive while transition request event Q1 is performed. Input events E2 through E4 are stored in the queue 116 in order of arrival. Transition request event Q1 terminates at time T4. The screen-image processing portion 12 then notifies completion of transition request event Q1 to the event delivery control portion 11. In response to completion of transition request event Q1, the event delivery portion 117 delivers input event E2 stored at the beginning of the queue 116 to the screen-image processing portion 12. When input event E2 terminates, the event delivery portion 117 delivers input event E3. Transition request event Q2 is generated in response to input event E2 and is stored in the queue 116 because an unprocessed event remains. The event delivery portion 117 sequentially delivers the event stored at the beginning of the queue 116 each time the screen-image processing portion 12 finishes processing an event.

The user may repeatedly manipulate the input device 3 during the flow of processes. In such a case, several events (such as input events and transition request events) stay in the queue 116. Generally, processing time Te for input event E is completed with a sufficiently short time compared to the requested performance. By contrast, time Tq required for a transition request event (such as screen-image transition and an accompanying drawing process) is longer than time T3 required for an input event. A delay effect increases as a transition request event stays in the queue 116 longer. The function execution event such as enlarging or reducing a display image requires a longer time than an input event because a process such as redrawing is needed. In view of these considerations, the embodiment applies the sift process to the transition request event and the function execution event that are stored in the queue 116 as well as the other events and require a relatively long processing time compared to an input event.

The sift portion 115 selects an event to be discarded based on a policy described later from various unprocessed events and events newly stored in the queue 116 and performs a process (sift process) to discard an unnecessary event. The sift process uses different policies depending on whether an event to be sifted results from manipulation on the switch 31 or the touch panel 32.

The following describes, first, the policy of the sift process applied to an event resulting from manipulation on the switch 31. Suppose that a newly generated transition request event to be stored in the queue 116 indicates the same transition destination screen-image as another transition request event that is already stored in the queue 116. In such a case, the sift portion 115 discards the already existent transition request event. An example will be described with reference to FIG. 7.

Figure 7:
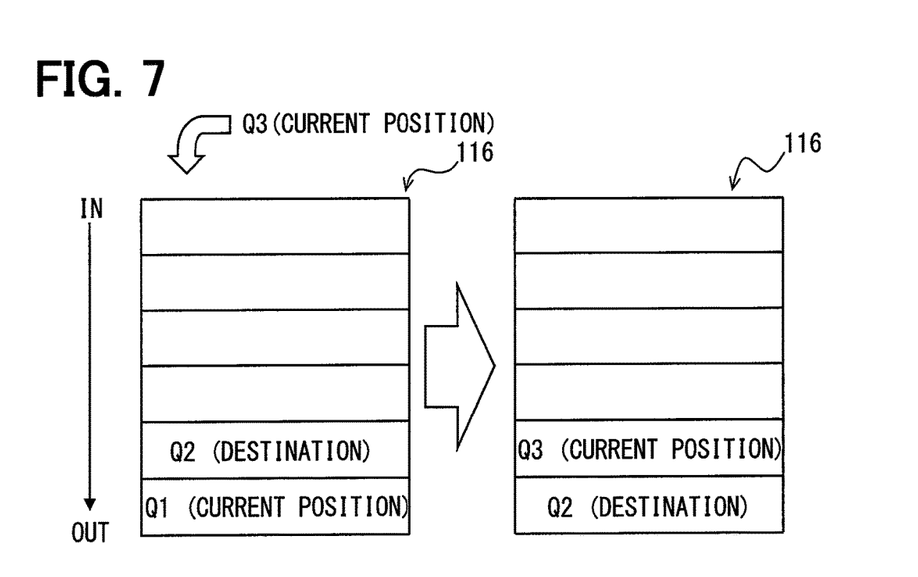
FIG. 7 is a conceptual diagram illustrating an effect of a sift process applied to transition request events.

FIG. 7 illustrates that the queue 116 stores transition request events Q1 and Q2. Transition request event Q1 transitions to the current position screen-image. Transition request event Q2 transitions to the destination setup screen-image. In such a situation, when transition request event Q3 to transition to the current position screen-image is newly received, it overlaps with transition request event Q1 that uses the same transition destination screen-image as transition request event Q3.

The sift portion 115 discards already existing transition request event Q1 because there is the transition request event using the same transition destination screen-image. The sift process is applied to transition request events corresponding to the same transition destination screen-image so that the most recently received transition request event survives on a last-come-first-served basis. The following issue occurs if the most recently received transition request event is discarded to sift on a first-come-first-served basis. With reference to FIG. 7, for example, transition request events Q1 and Q2 remain in the queue 116 after the sift process if transition request event Q3 is sifted on a first-come-first-served basis. The destination setup screen-image is finally displaced based on transition request event Q2. However, transition request event Q3 arrives after transition request event Q2. Therefore, the user finally needs the current position screen-image. Performing the sift process on a first-come-first-served basis may finally display a screen-image different from the one the user needs. For this reason, the embodiment performs the sift process on a last-come-first-served basis when transition request events corresponding to the same transition destination screen-image arrive. This can ensure a possibility that the finally displayed screen-image (current position screen-image) matches the screen-image (current position screen-image) the user finally needs.

Figure 8:
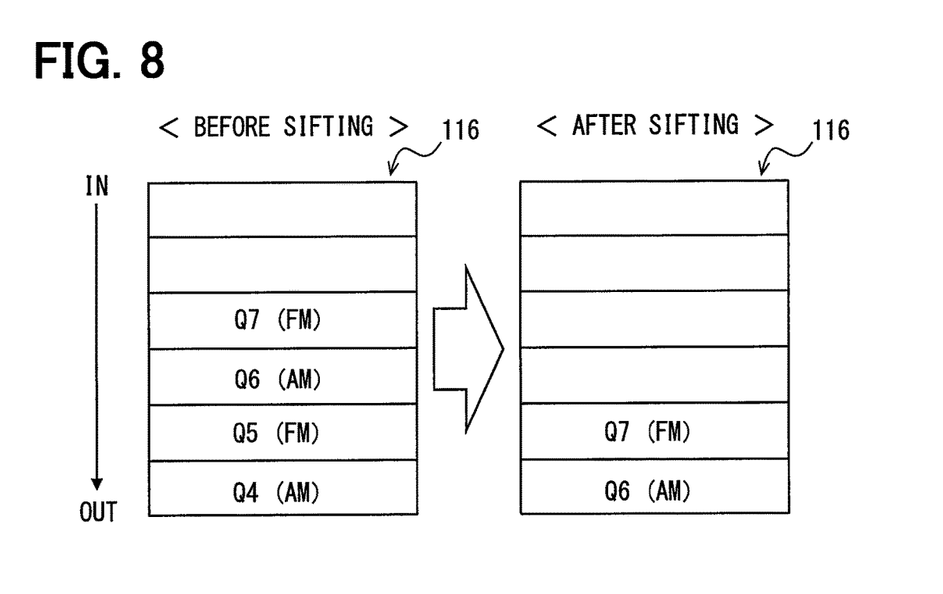
FIG. 8 is a conceptual diagram illustrating an effect of a sift process applied to transition request events.

The same applies to the radio switch 31C that allows different screen-images to transition in a specified order each time the button is pressed. The sift process sifts a transition request event on a last-come-first-served basis if the same transition destination screen-image corresponds to a newly arrived transition request event and the existing one. FIG. 8 illustrates this example. At the left of an arrow in FIG. 8, no sift process is performed on the queue 116. At the right thereof, the sift process is performed on the queue 116.

As illustrated at the left in FIG. 8, the radio switch 31C alternately sets the AM radio screen-image and the FM radio screen-image as the screen-image to transition each time the radio switch 31C is pressed. Assumed that the radio switch 31C is successively pressed four times to alternately store transition request events Q4, Q5, Q6, and Q7. Transition request events Q4 and Q6 use the AM radio screen-image as a transition destination. Transition request events Q5 and Q7 use the FM radio screen-image as a transition destination. Transition request events Q4 and Q6 use the same transition destination screen-image. Transition request events Q5 and Q7 use the same transition destination screen-image. In such a case, therefore, the sift portion 115 discards existing transition request events Q4 and Q5 and leaves newer transition request events Q6 and Q7. Transition request events Q6 and Q7 result from manipulation of the radio switch 31C but use different transition destination screen-images. Therefore, no sift process is performed. FIG. 8 illustrates an effect of sifting transition request events Q4 and Q5 at a time for convenience sake. The sift process may be performed each time each of transition request events Q6 and Q7 is stored in the queue 116.

The following describes the policy of the sift process applied to an event resulting from manipulation on the touch panel 32. The sift portion 115 discards any transition request event regardless of the transition destination screen-image if the transition request event results from manipulation on the touch panel 32 and arrives after an unprocessed transition request event if any. The reason follows. Normally, the display panel 4 displays a button that is effective while the screen-image is displayed. If a transition request event occurs, the screen-image transitions promptly to disable manipulation of a button displayed on the screen-image that was active before the transition.

However, a process delay may allow the queue 116 to store a transition request event corresponding to a user input to transition the screen-image. In such a case, the delay disables the screen-image transition and continues displaying the screen-image before the transition. A transition request event may result from manipulation on the touch panel 32 and arrive after another transition request event that is already stored in the queue 116. The arrived transition request event results from an invalid button displayed on the screen-image before the transition. The sift portion 115 discards a transition request event that results from manipulation on the touch panel 32 and arrives while an unprocessed transition request event exists.

Figure 9:
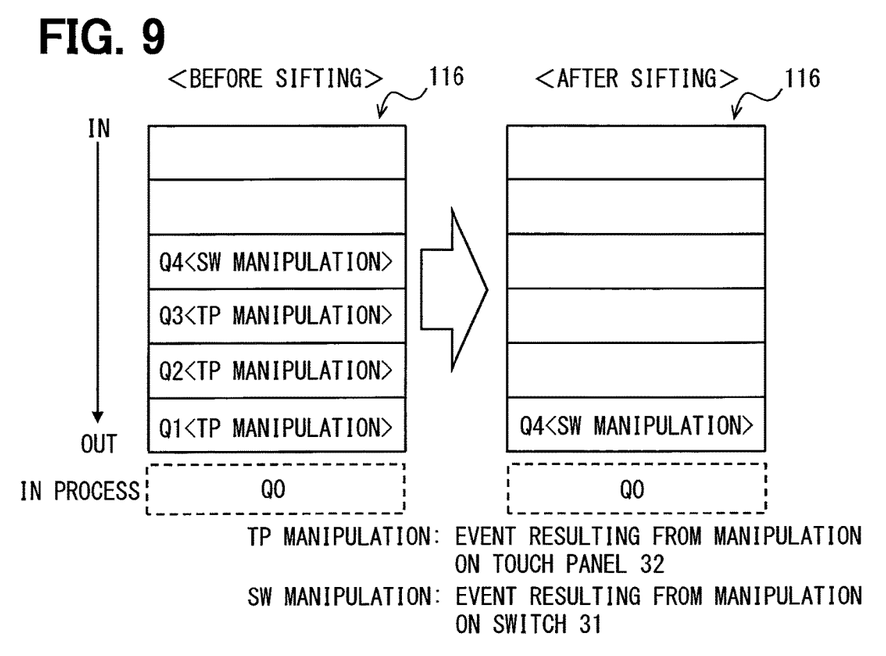
FIG. 9 is a conceptual diagram illustrating an effect of a sift process applied to transition request events caused by touch panel manipulation.

FIG. 9 illustrates an example of the sift process. At the left of an arrow in FIG. 9, no sift process is performed on the queue 116. At the right thereof, the sift process is performed on the queue 116. Reference symbols Q0 through Q4 denote transition request events. Transition request event Q0 is currently active. Transition request events Q1 through Q4 are stored in the queue 116. Transition request events Q1 through Q3 result from manipulation on the touch panel 32. Transition request event Q4 results from press of a switch included in the switch 31. The transition request event is currently active. In such a case, the sift portion 115 discards transition request events Q1 through Q3 resulting from manipulation on the touch panel 32 based on the policy.

The sift portion 115 does not discard transition request event Q4 resulting from manipulation on the switch 31. This is because the user may press the switch 31 at any time. However, a newly arrived transition request event may result from manipulation on the switch 31 and use the same transition destination screen-image as a transition request event already stored in the queue 116. In such a case, the sift process is performed on the duplicate transition request events. FIG. 9 illustrates an effect of sifting transition request events Q1 through Q3 resulting from manipulation on the touch panel 32 at a time for convenience sake. The sift process may be performed each time each of transition request events Q1 through Q3 is stored in the queue 116.

Figure 10:
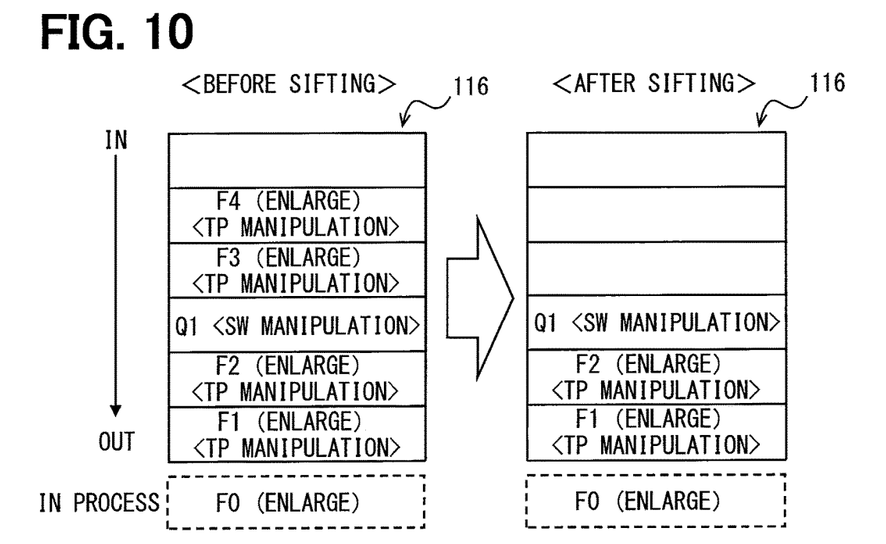
FIG. 10 is a conceptual diagram illustrating an effect of a sift process applied to function execution events.

The sift portion 115 discards any function execution event if the function execution event results from manipulation on the touch panel 32 and arrives after an unprocessed transition request event if any. FIG. 10 illustrates an example. Reference symbols F0 through F4 in FIG. 10 denote function execution events to enlarge a display. Function execution event F0 is currently active. Transition request event Q1 is associated with a rear-view camera screen-image. According to FIG. 10, the gearshift lever changes to the rear position while the user manipulates the touch panel 32 to enlarge the map display. The transition request event to transition to the rear-view camera screen-image interrupts the function execution event to enlarge the display.

Sequentially performing the events stored in the queue 116 without performing the sift process enlarges the rear-view camera screen-image after the transition due to the transition request event Q1. However, the user intended to enlarge the screen-image (map screen-image) before the transition. The user does not intend to enlarge the rear-view camera screen-image. To solve this, the sift portion 115 discards the function execution events F3 and F4 that arrived after the transition request event Q1. This can reduce a possibility of causing an operation (enlarging the rear-view camera screen-image) the user does not expect. Another embodiment may discard a function execution event resulting from manipulation on the switch 31 based on the same policy as for events resulting from manipulation on the touch panel 32.

Figure 11:
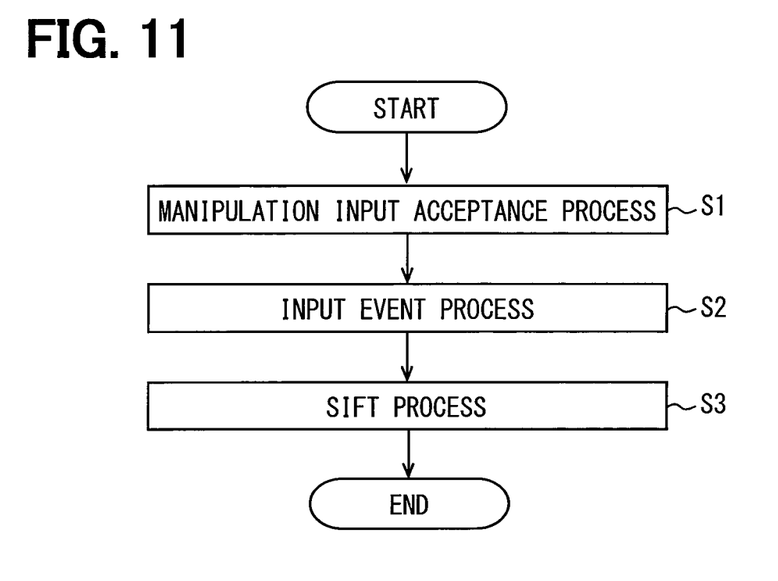
FIG. 11 is a flowchart illustrating a flow of processes in which the display control device reaches the sift process.

With reference to a flowchart in FIG. 11, the following describes a flow of a process performed by the display control device 1. The flowchart is performed periodically (e.g., 20 milliseconds). At step S1, the screen-image processing portion 12 performs a manipulation input acceptance process and proceeds to step S2. In the manipulation input acceptance process at step S1, a manipulation signal from the input device 3 is input to the input acceptance portion 10. In response to this, the event generation portion 113 generates an input event and stores it in the queue 116. Various events stored (waiting) in the queue 116 are sequentially performed. An active event or a waiting event may be unavailable when an input event is generated. In such a case, the input event is delivered to the screen-image processing portion 12 without delay.

At step S2, the screen-image processing portion 12 performs an input event process and proceeds to step S3. The input event process at step S2 starts when the input event generated at step S1 is delivered to the screen-image processing portion 12. The input event process determines a process content based on the user manipulation information the screen-image processing portion 12 acquires from the event delivery control portion 11. The screen-image processing portion 12 returns a notification to the event delivery control portion 11 in order to request that the determined process content is performed. Based on the notification returned from the screen-image processing portion 12, the event delivery control portion 11 allows the event generation portion 113 to generate various events (such as a transition request event and a function execution event).

At step S3, the screen-image processing portion 12 performs a sift process and proceeds to step S4. In the sift process at step S3, the sift portion 115 selects an event to be discarded based on the policy according to an unprocessed event and an event newly stored in the queue 116 when storing the event generated at step S2, and discards the selected event.

According to the configuration, the sift portion 115 retains the most recent transition request event and discards the other out of duplicate transition request events that use the same type of screen-image after the transition. The configuration can decrease transition request events stored in the queue 116 compared to a case of not sifting transition request events and reduce a possibility of generating a delay.

The sift process does not sift a transition request event that transitions to a different type of screen-image. This can restrict the sift process from disabling a display of the type of screen-image the user intends to display based on his or her manipulation.

If a transition request event results from manipulation on the switch 31, the sift process is applied to the transition request event based on a last-come-first-served rule. This can increase the possibility that the screen-image finally displayed on the display panel 4 corresponds to the screen-image the user finally needs. Another embodiment may not use the last-come-first-served rule. If duplicate transition request events use the same type of screen-image after the transition, the sift portion 115 may retain one of the duplicate transition request events and discard the other.

The embodiment discards any transition request event regardless of the transition destination screen-image if the transition request event results from manipulation on the touch panel 32 and arrives after an unprocessed transition request event if any. This can further decrease the number of events stored in the queue 116 and suppress a delay.

The embodiment sifts a function execution event arrived after a transition request event that is being processed or is stored. This can reduce a possibility of causing an operation the user does not expect and suppress a delay.

The embodiment does not sift an input event corresponding to the accomplished manipulation, but a transition request and a function execution event corresponding to a process to be performed for the user manipulation. Another display control device may simply sift duplicate input events.

However, different transition destination screen-images are used for an input event corresponding to input manipulation on a toggle switch such as the radio switch 31C though the input event results from a press on the same switch. Simply sifting duplicate input events may disable the display of a user-intended screen-image. The embodiment sifts a transition request and a function execution event, not an input event, and enables to reduce a possibility of disabling the display of a user-intended screen-image.

An input event such as pressing the destination switch 31B causes a transition request event and uniquely settles the transition destination screen-image for the transition request event. The sift process may be applied to such an input event separately.

The embodiment performs the sift process when various newly generated events are stored in the queue 116. However, the embodiment is not limited thereto. The sift process may be performed after an event is stored in the queue 116. Alternatively, the sift process may be performed when an event stays in the queue 116 and a delay is estimated to occur for a specified time period or longer.

While there have been described the specific preferred embodiments and configurations of the present disclosure, it is to be distinctly understood that the disclosure is not limited to the embodiments and structures but may be otherwise variously embodied within the spirit and scope of the present disclosure. The present disclosure includes various modified examples and modifications within the applicable scope. It is also understood that the scope of the disclosure and the general inventive concept thereof cover preferred combinations and forms or the other combinations and forms including only one element or more or fewer than the same.

What is claimed is:

1. A display control device comprising:
a screen image processing portion that executes a process for transitioning from a screen image displayed on a screen of a display device to another type of screen image;
an input acceptance portion that accepts a user manipulation input to perform the process executed in the screen image processing portion;
a queue that stores an event in chronological order to be executed by the screen image processing portion based on the manipulation input accepted by the input acceptance portion;
an event delivery portion that
monitors a situation of the process executed by the screen image processing portion,
delivers the event, which is stored at a beginning of the queue, to the screen image processing portion each time when the screen image processing portion finishes the process, and
deletes the event, which is delivered to the screen image processing portion, from the queue;
and
a sift portion that sifts the transition request event stored in the queue,
wherein the event includes a transition request event to transition from the screen-image displayed on the screen of the display device to the another type of screen image,
wherein the screen image processing portion transitions from the screen-image displayed on the display device to the another type of screen image according to the transition request event in response to the event delivery portion delivering the transition request event to the screen image processing portion, and
wherein, when the queue stores a plurality of transition request events each corresponding to a same type of screen-image after transition, the sift portion retains a newest transition request event of the plurality of the transition request events that was most recently stored in the queue, and discards the other transition request events of the plurality of transition request events that correspond to the same type of screen-image after transition and that were stored in the queue before the newest transition request.

2. The display control device according to claim 1,
wherein the input acceptance portion accepts the user manipulation input to change a display on a same type of screen-image;
wherein the queue stores a function execution event that changes a display on the same type of screen-image in response to the manipulation input accepted by the input acceptance portion;
wherein the screen-image processing portion changes display of the screen-image based on the function execution event; and
wherein the sift portion discards a function execution event in any one of cases where the function execution event arrives while a transition request event is performed and where the function execution event arrives later than a transition request event already stored in the queue.

3. The display control device according to claim 2,
wherein the function execution event performs at least one of increasing a scale of the display of the screen-image, reducing a scale of the display of the screen-image, and scrolling the screen-image.

4. The display control device according to claim 1,
wherein the input acceptance portion accepts the user manipulation input via a touch panel; and
wherein the sift portion discards a transition request event the input acceptance portion accepts via the touch panel in any one of cases where the transition request event is accepted while another transition request event is performed and where the transition request event is accepted later than a transition request event already stored in the queue.

5. The display control device according to claim 1, comprising:
an event generation portion that generates an event the screen-image processing portion performs,
wherein the event generation portion generates an input event to determine a process content of the user manipulation input accepted by the input acceptance portion;
wherein the queue stores the input event;
wherein the screen-image processing portion performs the input event to determine a process content of the user manipulation input; and
wherein the event generation portion generates the transition request event based on the process content and stores the transition request event in the queue.

6. The display control device according to claim 5,
wherein, when the input acceptance portion accepts the user manipulation input, the event generation portion responds to the manipulation input to generate a transition request event, a transition destination screen-image of the generated transition request event has a one-to-one relationship with the manipulation input, and, when the queue stores a plurality of input events generated based on the manipulation input, the sift portion retains a most recent one of duplicate input events and discards the other input events.

* * * * *